US012111606B2

(12) United States Patent
Akama

(10) Patent No.: US 12,111,606 B2
(45) Date of Patent: Oct. 8, 2024

(54) IMAGE FORMING APPARATUS

(71) Applicant: Shiro Akama, Tokyo (JP)

(72) Inventor: Shiro Akama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/095,146

(22) Filed: Jan. 10, 2023

(65) Prior Publication Data

US 2023/0259064 A1 Aug. 17, 2023

(30) Foreign Application Priority Data

Feb. 15, 2022 (JP) ................................ 2022-021368
Oct. 26, 2022 (JP) ................................ 2022-171129

(51) Int. Cl.
*G03G 21/16* (2006.01)

(52) U.S. Cl.
CPC ..... *G03G 21/1647* (2013.01); *G03G 21/1666* (2013.01)

(58) Field of Classification Search
CPC ........... G03G 21/1642; G03G 21/1647; G03G 21/1661; G03G 21/1666; G03G 21/1842
See application file for complete search history.

(56) References Cited

U.S. PATENT DOCUMENTS

2013/0064567 A1 3/2013 Akama et al.
2014/0248066 A1 9/2014 Akiyama et al.
2016/0154375 A1* 6/2016 Kamizato .......... G03G 21/1623 399/111
2016/0161903 A1 6/2016 Akama et al.
2016/0187825 A1 6/2016 Ueda et al.
2017/0300006 A1* 10/2017 Uchida .............. G03G 21/1619
2019/0286047 A1 9/2019 Ishimitsu et al.
2021/0103247 A1 4/2021 Akama et al.

FOREIGN PATENT DOCUMENTS

JP 2000-147409 5/2000
JP 2011-095522 5/2011
JP 2015-101431 6/2015

* cited by examiner

*Primary Examiner* — Thomas S Giampaolo, II
(74) *Attorney, Agent, or Firm* — Duft & Bornsen, PC

(57) ABSTRACT

An image forming apparatus includes a housing, a detachable unit, and a guide. The detachable unit is attachable to and detachable from the housing. The guide guides the detachable unit when the detachable unit is attached to or detached. The guide includes a first guide portion inclined downward to guide the detachable unit such that the detachable unit moves downward in a direction in which the detachable unit is detached. The detachable unit includes a positioning portion that protrudes in a direction in which the detachable unit is attached to the housing. The housing includes a unit positioner that engages with the positioning portion of the detachable unit at a position above the guide to position the detachable unit. The guide includes a second guide portion that extends from an upper end of the first guide portion toward a side of the housing in which the unit positioner is disposed.

6 Claims, 10 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-021368, filed on Feb. 15, 2022, and 2022-171129, filed on Oct. 26, 2022, in the Japan Patent Office, the entire disclosure of each of which is hereby incorporated by reference herein.

BACKGROUND

Technical Field

Embodiments of the present disclosure relate to an image forming apparatus.

Related Art

A technology is known in which, for example, a writing unit is attachable to and detachable from an image forming apparatus when maintenance of the image forming apparatus is performed. When a new apparatus is designed, the entire structure of the new apparatus may be designed without greatly changing from the structure of a conventional apparatus in view of, for example, the workload of design and the accuracy of image formation. When such a new apparatus is designed, functions such as printing speed of the apparatus may be enhanced more than the functions of the conventional apparatus, and the layout of some units of the apparatus may be changed. In this case, when a writing unit is attached to or detached from the apparatus, a unit as a part of components may be present in a path in which the writing unit is attached to or detached from the apparatus due to such a change of the layout. Accordingly, such a unit may be a barrier to an attachment and detachment operation of the writing unit.

SUMMARY

In an embodiment of the present disclosure, an image forming apparatus includes a housing, a detachable unit, and a guide. The detachable unit is attachable to and detachable from the housing. The guide guides the detachable unit when the detachable unit is attached to or detached from the housing. The guide includes a first guide portion inclined downward to guide the detachable unit such that the detachable unit moves downward in a direction in which the detachable unit is detached from the housing. The detachable unit includes a positioning portion that protrudes in a direction in which the detachable unit is attached to the housing. The housing includes a unit positioner that engages with the positioning portion of the detachable unit at a position above the guide to position the detachable unit. The guide includes a second guide portion that extends from an upper end of the first guide portion toward a side of the housing in which the unit positioner is disposed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1B:
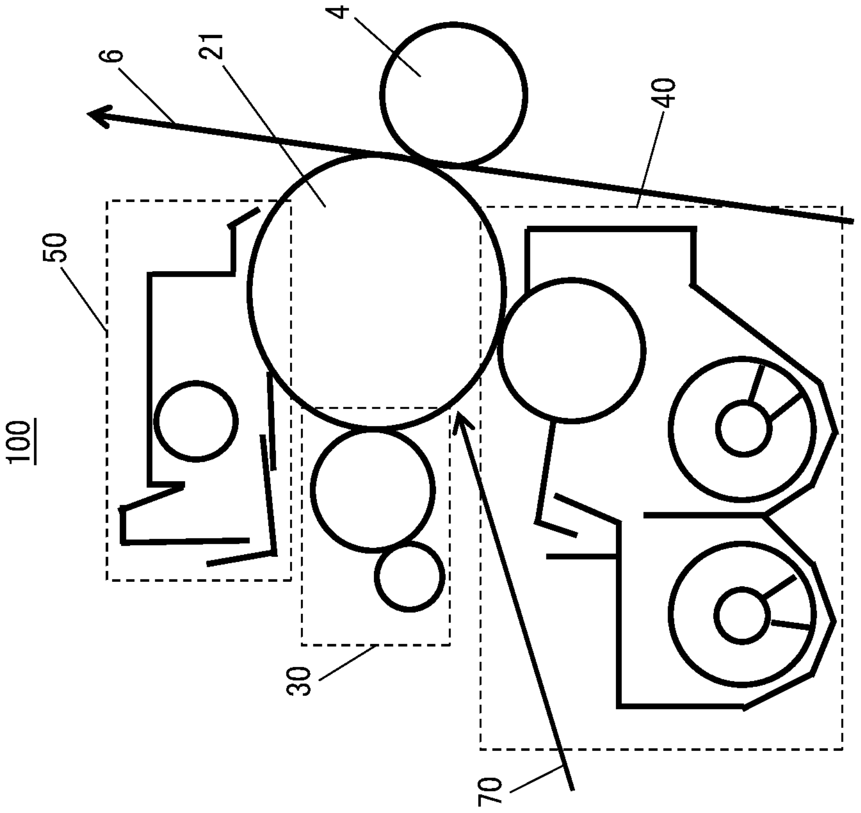
FIG. 1B is an enlarged diagram illustrating a configuration around a photoconductor module according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

First, an image forming apparatus according to an embodiment of the present disclosure is described.

Figure 1A:
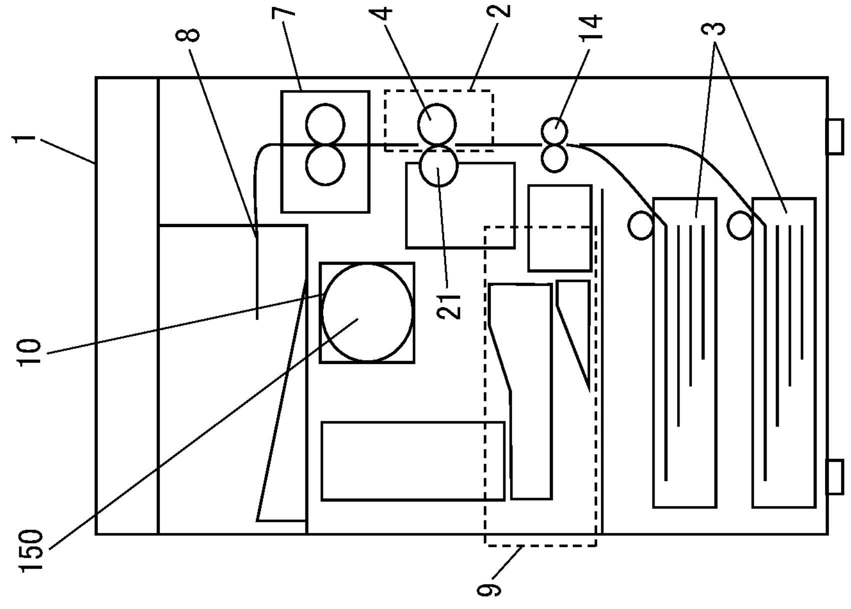
FIG. 1A is a schematic diagram illustrating an image forming apparatus according to an embodiment of the present disclosure.

FIG. 1A is an overall view of an image forming apparatus 1 according to an embodiment of the present disclosure. FIG. 1B is an enlarged view of a photoconductor module and surrounding components according to the present embodiment. In the present embodiment, the image forming apparatus 1 is a copier. The image forming apparatus 1 is a monochrome copier. The image forming apparatus 1 is described as a monochrome copier in the following description. However, in some embodiments, an image forming apparatus may be a color copier. The image forming apparatus 1 includes an image forming device 100 for forming a toner image of black color (K color). The image forming device 100 includes a photoconductor module, a charging module 30, a developing module 40, and a cleaning module 50. The photoconductor module, the charging module 30, the developing module 40, and the cleaning module 50 are detachable from the body of the image forming apparatus 1. The photoconductor module includes a drum-shaped photoconductor 21. The charging module 30 includes a charger. The developing module 40 includes a developing device that uses a two-component developer containing toner and magnetic carrier to perform development. In the present embodiment, the two-component developer is employed. However, in some embodiments, one-component developer may be employed. The cleaning module 50 includes a cleaner that cleans the photoconductor 21.

A writing device 9 includes a writing unit 92. The writing unit 92 irradiates the photoconductor 21 with irradiation light 70 such as laser light to form an electrostatic latent image. Further, the image forming apparatus 1 includes a bottle container 10 that holds a toner bottle 150 containing developing toner above the writing unit 92.

The toner bottle 150 is attachable to and detachable from the bottle container 10. The toner bottle 150 is detached from the bottle container 10 and replaced with a new toner bottle 150 when, for example, the toner bottle 150 is empty.

A transfer unit 2 includes a transferor 4 as a transfer roller. The transferor 4 as a transfer roller contacts the photoconductor 21 to form a transfer nip. At the transfer nip, a transfer bias is applied to the transferor 4 to form a transfer electric field. Note that in some embodiments, a transfer belt may be employed in a transfer unit.

The image forming apparatus 1 includes a fixing unit 7 that fixes a toner image transferred onto a recording medium such as a sheet of paper above the transfer unit 2 as illustrated in FIG. 1A. The fixing unit 7 includes heating rollers. Each of the heating rollers includes a heating element. The recording medium on which the toner image has been transferred is conveyed, between the transfer unit 2 and the fixing unit 7, toward the fixing unit 7 in a recording medium conveyance direction 6 (see FIG. 1B). The image forming apparatus 1 also includes sheet feeders 3 that feed a recording medium to the transfer unit 2 in a lower body of the image forming apparatus 1. The image forming apparatus 1 further includes a sheet ejector 8 that ejects the recording medium, which has passed through the fixing unit 7, to the outside of the image forming apparatus 1, in the left side of the fixing unit 7 in FIG. 1A.

When the image forming apparatus 1 starts, for example, a printing operation, the image forming apparatus 1 starts driving, for example, the transfer roller. Then, the charger of the charging module 30 uniformly charges the surface of the photoconductor 21 to a predetermined charging potential while the photoconductor 21 rotates. The image forming apparatus 1 performs an optical scanning that uses the irradiation light 70 emitted by the writing unit 92 based on image data to form an electrostatic latent image on the charged surface of the photoconductor 21. The electrostatic latent image is developed as a toner image by the developing module 40. Subsequently, the toner image is transferred to a recording medium conveyed from the sheet feeder 3 to be described later. Transfer residual toner that remains on the surface of the photoconductor 21, after the toner image has been transferred onto the recording medium, is removed from the surface of the photoconductor 21 by the cleaner of the cleaning module 50.

The sheet feeder 3 conveys the recording medium until the recording medium contacts a registration roller pair 14 in parallel with the operation of forming the toner image. When the recording medium contacts the registration roller pair 14, the sheet feeder 3 stops conveyance of the recording medium. Then, the registration roller pair 14 resumes rotation at a timing when the toner image on the photoconductor 21 reaches the transfer nip. The conveyance of the recording medium is resumed when rotation of the registration roller pair 14 resumes. Subsequently, the toner image is transferred onto the recording medium in synchronization with the toner image on the photoconductor 21 at the transfer nip.

The recording medium onto which the toner image has been transferred moves into the fixing unit 7. Then, the fixing unit 7 applies heat and pressure to the toner image on the recording medium to fix the toner image onto the recording medium. Subsequently, the recording medium is moved to the sheet ejector 8, and the sheet ejector 8 ejects the recording medium onto an output tray outside the image forming apparatus 1 (e.g., on the left side of the image forming apparatus 1).

Next, the writing device 9 according to an embodiment of the present disclosure is described.

Figure 2A:
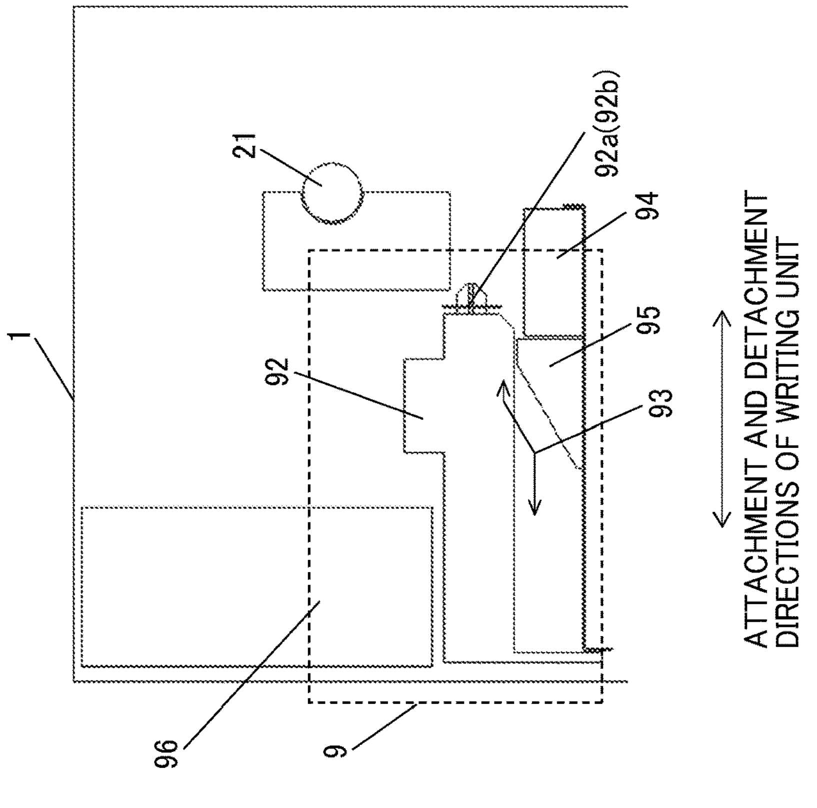
FIG. 2A is a diagram illustrating a writing unit provided for the image forming apparatus of FIG. 1A.
Figure 2B:
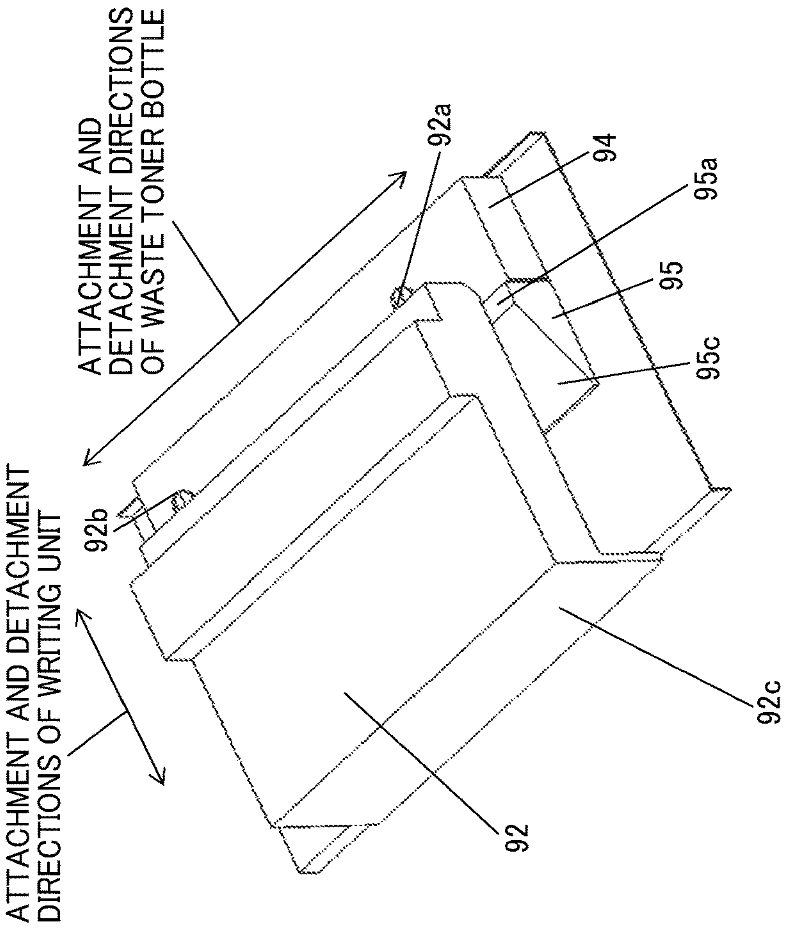
FIG. 2B is a perspective view of the writing unit of FIG. 2A when the writing unit is attached to a housing of the image forming apparatus of FIG. 1A.

First, as illustrated in FIG. 2A, the writing device 9 of the image forming apparatus 1 according to the present embodiment includes a writing unit 92 and a guide 95. The guide 95 serves as a guide when the writing unit 92 is attached to and detached from the image forming apparatus 1. Note that the writing unit 92 is an example of a first detachable unit. In addition, the image forming apparatus 1 according to the present embodiment includes an electrical unit 96 above the writing unit 92 in an upper portion of the image forming apparatus 1 in the vertical direction. The electrical unit 96 is fixed to the image forming apparatus 1. In the present embodiment, the electrical unit 96 is an example of a unit (component) that is fixed to the image forming apparatus 1. The writing unit 92 includes a housing 92*c* that is made of resin. The image forming apparatus 1 includes a waste toner bottle 94 for collecting toner that has not been transferred to a recording medium such as a sheet of paper and remains on the photoconductor 21. In the present embodiment, the waste toner bottle 94 is an example of a second detachable unit. FIG. 2B is a perspective view of the writing unit 92 when the writing unit 92 is attached to the housing of the image forming apparatus 1. The housing of the image forming apparatus 1 to which the writing unit 92 is attached may be a housing made of sheet metal, a housing made of resin, or a combination of sheet metal and resin.

Before further describing embodiments of the present disclosure, a case in which a writing unit is attached to and detached from an image forming apparatus according to a comparative example of the present disclosure is described with reference to FIG. 3A.

Figure 3B:
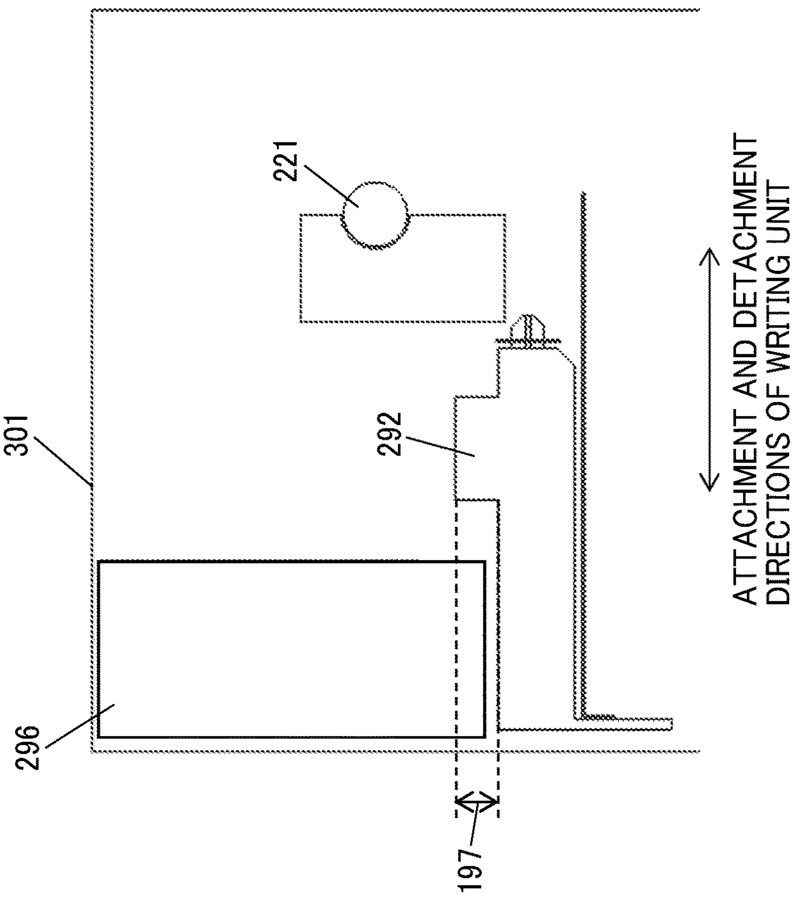
FIG. 3B is a diagram illustrating an image forming apparatus, when the writing unit is attached to or detached from the image forming apparatus.
Figure 3A:
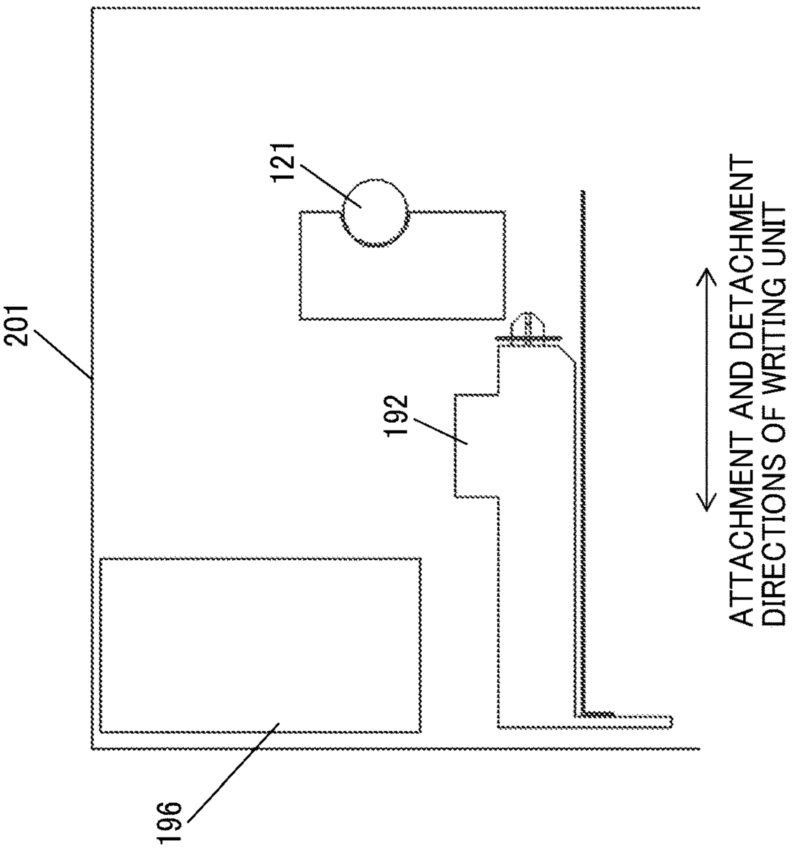
FIG. 3A is a diagram illustrating a periphery of a writing unit of an image forming apparatus according to a comparative example of the present disclosure.

FIG. 3A is a diagram illustrating a writing unit 192 and its surroundings of an image forming apparatus 201 according to a comparative example of the present disclosure. The image forming apparatus 201 includes a photoconductor 121. When, for example, maintenance is performed, the writing unit 192 is attached from the outside to the inside of the image forming apparatus 201 and detached from the inside to the outside of the image forming apparatus 201 by an operator through an opening disposed on a side (left side in FIG. 3A) of the image forming apparatus 201. In addition, it is assumed that an electrical unit 196 is located above the writing unit 192 and is not on a path, which is referred to simply as an attachment-and-detachment path in the following description, through which the writing unit 192 is attached to or detached from the image forming apparatus 201. When the writing unit 192 is attached to or detached from the image forming apparatus 201, there is no component that acts as a barrier in the attachment-and-detachment path. Accordingly, the writing unit 192 is only moved along a horizontal direction from the image forming apparatus 201 to be attached to or detached from the image forming apparatus 201.

Based on the above description, it is assumed that a configuration of a new image forming apparatus is designed and the configuration is described in the following description. Desirably, the relative positions of the writing unit and the photoconductor in the image forming apparatus according to the above-described comparative example are adopted for the new image forming apparatus without any changes, in view of, for example, the workload in designing the new image forming apparatus and the accuracy of image formation. For this reason, in the new image forming apparatus, the relative positions of the writing unit and the photoconductor in the image forming apparatus according to the above-described comparative example is adopted.

It is assumed that the specifications of the new image forming apparatus have been changed. Due to the change of the specifications, it is assumed that the size of the electrical unit 196 is increased. FIG. 3B is a diagram illustrating an image forming apparatus 301 as a newly designed image forming apparatus as described above. The image forming apparatus 301 includes a photoconductor 221. In this configuration, it is assumed that the writing unit 292 is attached to or detached from the newly designed image forming apparatus 301 through an opening, which is on the left side in FIG. 3B, disposed in the image forming apparatus 301. At this time, as illustrated in FIG. 3B, the electrical unit 296 is present in the attachment-and-detachment path at a position 197 at which the electrical unit 296 overlaps the writing unit 292 in an up-and-down direction with respect to directions in which the writing unit 292 is attached to or detached from the image forming apparatus 301. Accordingly, the electrical unit 296 acts as a barrier when the writing unit 292 is attached to or detached from the image forming apparatus 301. For this reason, moving the writing unit 292 in the horizontal direction only does not allow the writing unit 292 to be attached to or detached from the image forming apparatus 301.

When the writing unit 292 is moved in the horizontal direction to be attached to and detached from the image forming apparatus 301, the electrical unit 296 needs to be detached from the image forming apparatus 301 every time the writing unit 292 is attached to or detached from the image forming apparatus 301. However, in such a case, the number of man-hours to perform the above-described operation increases. Alternatively, for example, a configuration in which the electrical unit 296 is not detached from the image forming apparatus 301 and is disposed above an area outside the attachment-and-detachment path may also be employed. However, in such a case, the size of the image forming apparatus 301 may be increased.

For this reason, in an embodiment of the present disclosure, the following measures are taken against the above-described disadvantages. As illustrated in FIG. 2A, the overall size of the image forming apparatus 1, the position of the electrical unit 96 disposed above the writing unit 92, and the position of the photoconductor module that includes the drum-shaped photoconductor 21 that rotates about the rotation axis of the photoconductor 21 are not changed. However, an area below the electrical unit 96 is increased. Thus, an attachment-and-detachment path 93 is provided for the writing unit 92. In addition to such a configuration as described above, the image forming apparatus 1 includes a guide 95. The guide 95 guides the writing unit 92 to a position at which the writing unit 92 is attached when the writing unit 92 is attached to the housing of the image forming apparatus 1. The guide 95 also guides the writing unit 92 to the attachment-and-detachment path 93 below the electrical unit 96 when the writing unit 92 is detached from the housing of the image forming apparatus 1. The guide 95 is made of resin and has a slope 95*c* that is inclined downward to guide the movement of the writing unit 92 such that the writing unit 92 moves downward when the writing unit 92 is detached. In the present embodiment, the slope 95*c* is an example of a first guide. An inclination angle of the slope 95*c* is preferably set to equal to or smaller than 45 degrees. In addition, the guide 95 includes holes in a bottom 95*d* (see FIG. 5), and is screwed and fixed to the housing of the image forming apparatus 1 through the holes.

A predetermined gap is disposed between the electrical unit 96 and the writing unit 92. Thus, when the writing unit 92 is attached to or detached from the image forming apparatus 1, the writing unit 92 does not contact the electrical unit 96.

The attachment-and-detachment path 93 does not extend along a simple horizontal direction. However, the attachment-and-detachment path 93 is a path that passes below the electrical unit 96 to avoid interference between the electrical unit 96, which is a component fixed to the housing of the image forming apparatus 1, and the writing unit 92. Accordingly, when the writing unit 92 is attached to or detached from the image forming apparatus 1, it is not necessary to detach the electrical unit 96 that has been fixed to the image forming apparatus 1.

Figure 4B:
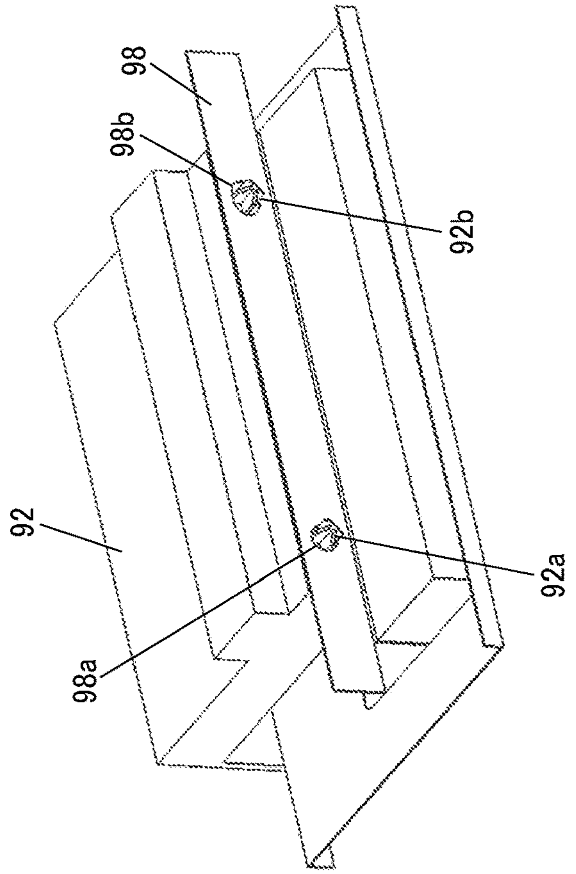
FIGS. 4A and 4B are diagrams illustrating a configuration in which the writing unit of FIG. 2A is attached to and positioned in the image forming apparatus of FIG. 1A.
Figure 4A:
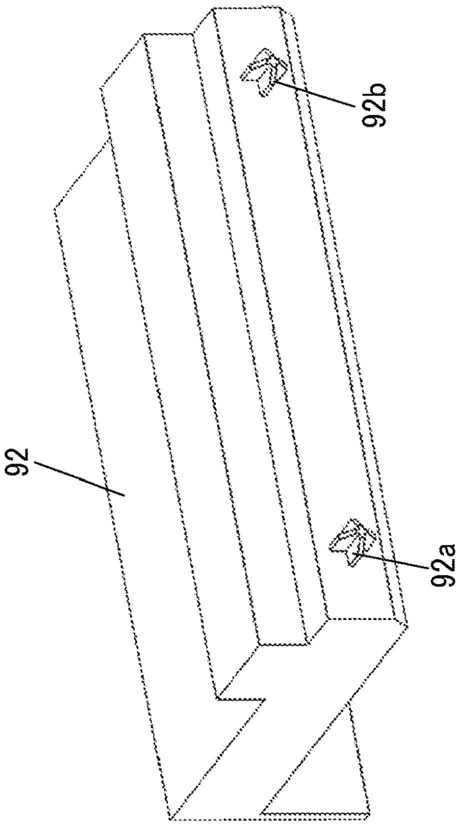

Next, a configuration in which the writing unit 92 is attached to the image forming apparatus 1 is described. FIGS. 4A and 4B are diagrams illustrating a configuration in which the writing unit 92 is attached to and positioned in the image forming apparatus 1, according to the present embodiment. In FIG. 4A, the writing unit 92 includes convex-shaped positioning bosses 92*a* and 92*b* to position the writing unit 92 with respect to the housing of the image forming apparatus 1 on a front side of the writing unit 92 in a direction in which the writing unit 92 is attached to the image forming apparatus 1, which is the right side in FIG. 2A. In the present embodiment, the positioning bosses 92*a* and 92*b* are examples of positioning portions. As illustrated in FIG. 4B, the positioning bosses 92*a* and 92*b* are engaged with positioning holes 98*a* and 98*b*, respectively. The positioning holes 98*a* and 98*b* are disposed on a frame 98 that has a flat surface extending in the up-and-down direction such that the positioning bosses 92*a* and 92*b* enter the frame 98 in the vertical direction. The frame 98 is an example of a unit positioner. Both ends of the frame 98 are attached to the housing of the image forming apparatus 1 such that the frame 98 is supported and fixed in the vertical direction, i.e., the up-and-down direction, and in the left-right direction which is the rotation axis direction of the photoconductor 21.

A description is given below of a reason why the positioning bosses 92*a* and 92*b* are disposed on the writing unit 92 and the positioning holes 98*a* and 98*b* are disposed on the frame 98. It is assumed that the frame 98 includes convex-shaped positioning members such as bosses and the writing unit 92 includes positioning holes to be engaged with the positioning members. In such a case, the frame 98 is typically formed of a sheet metal. For this reason, if convex-shaped positioning members such as bosses are disposed on the frame 98, the size of the positioning members may not be increased due to processing of the frame 98 as the sheet metal. When the writing unit 92 is attached to the image forming apparatus 1, if an operator looks at the frame 98 from a direction in which the writing unit 92 is detached, which is the left side in FIG. 2A, the frame 98 is located at a rear portion of the image forming apparatus 1. Consequently, the frame 98 is unlikely to be visually recognized. At this time, if the shape of the convex-shaped positioning members is small, the frame 98 is located at a rear portion of the image forming apparatus 1 and is unlikely to be visually recognized. Consequently, it is not possible to determine whether the writing unit 92 is reliably attached.

For this reason, it is preferable to increase the size such as diameter or length of the convex-shaped positioning members so that the writing unit 92 can be reliably attached to the image forming apparatus 1.

In the writing unit 92 according to the present embodiment, the housing 92*c* of the writing unit 92 is made of resin. Thus, the positioning bosses 92*a* and 92*b* can be formed in a large shape. Accordingly, convex-shaped positioning members are disposed on the writing unit 92.

In the present embodiment, the writing unit 92 has a configuration as described below such that the writing unit 92 can be easily attached to and positioned in the image forming apparatus 1.

Figure 5:
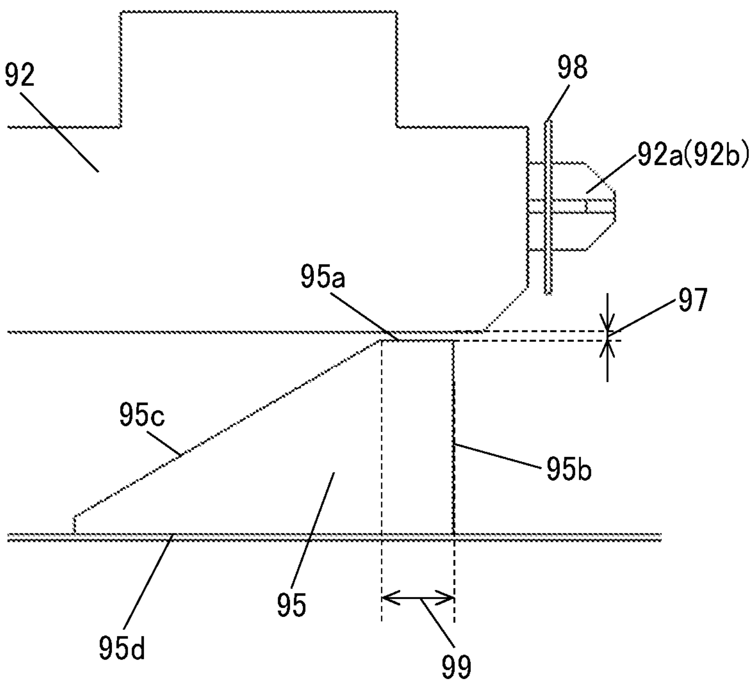
FIG. 5 is a diagram illustrating a guide according to an embodiment of the present disclosure.

As illustrated in FIG. 5, the guide 95 includes a horizontal portion 95*a* in the vicinity of a position at which the writing unit 92 is attached to the frame 98 that is fixed to the image forming apparatus 1. The horizontal portion 95*a* is an example of a second guide. The horizontal portion 95*a* is a horizontal surface and extends horizontally from an upper end of the slope 95*c* toward the frame 98. Note that, in the present embodiment, a length 99 of the horizontal portion 95*a* in the horizontal direction is 11 millimeters (mm). As described above, the length 99 of the horizontal portion 95*a* in the horizontal direction is 11 mm in the present embodiment. However, the length 99 being 11 mm is merely an example, and the length 99 may be changed as needed according to, for example, the configuration of the writing unit 92, or may have a numerical range.

Accordingly, a horizontal bottom surface of the writing unit 92 is guided by the horizontal portion 95*a* when the writing unit 92 is attached to the frame 98. Thus, the writing unit 92 can be stably maintained in a horizontal posture. Further, the horizontal portion 95*a* allows the positioning bosses 92*a* and 92*b*, which horizontally extend, of the writing unit 92 to be smoothly moved vertically into or out of the holes 98*a* and 98*b* of the frame 98.

Accordingly, even if the positioning bosses 92*a* and 92*b* of the writing unit 92 are not visible during attachment and detachment of the writing unit 92 because the positioning bosses 92*a* and 92*b* are located at a rear portion of the image forming apparatus 1 when viewed from a direction in which the writing unit 92 is detached, the writing unit 92 can be easily attached to and positioned in the image forming apparatus 1. Note that the horizontal portion 95*a* does not necessarily need to be horizontal, and may be slightly inclined as long as the writing unit 92 can be guided to be parallel to a direction in which the positioning bosses 92*a* and 92*b* extend.

Figure 6A:
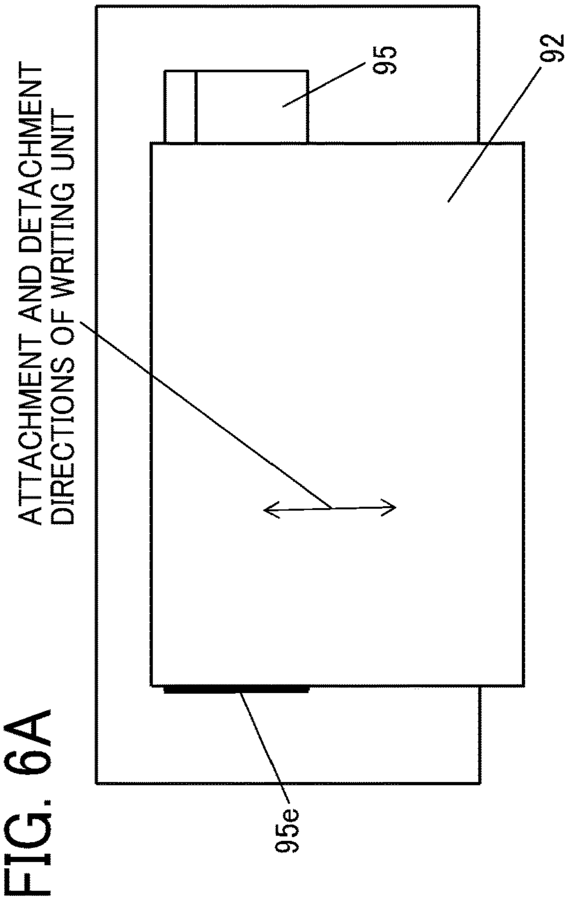
FIGS. 6A, 6B, and 6C are diagrams illustrating a configuration in which an end of the writing unit of FIG. 2A is restricted when the writing unit is attached to or detached from the image forming apparatus of FIG. 1A.
Figure 6B:
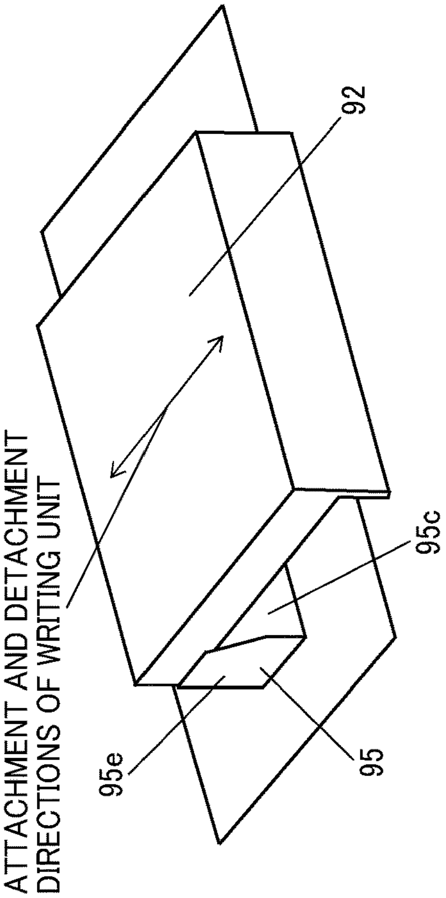
Figure 6C:
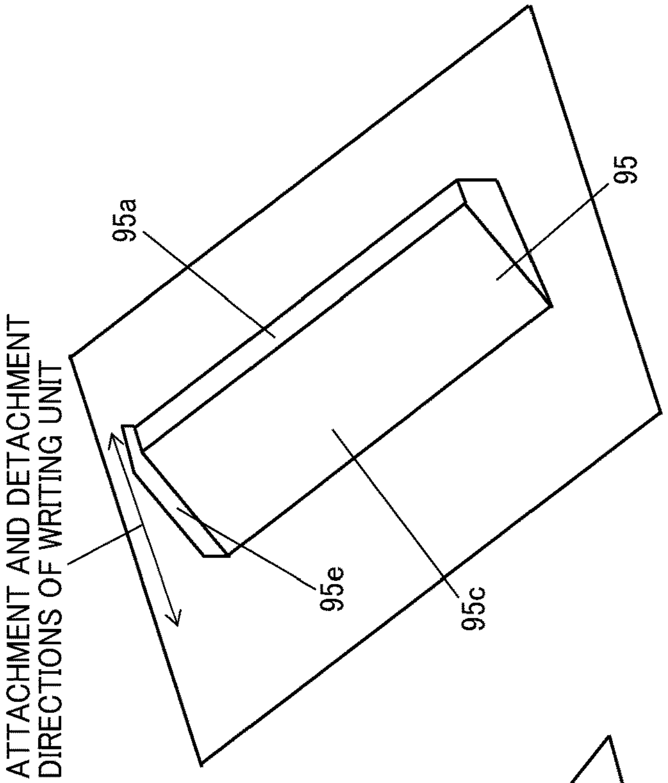

As illustrated in FIGS. 6A, 6B, and 6C, the guide 95 includes an end guide 95*e* that extends parallel to the direction in which the writing unit 92 is attached to or detached from the housing. FIG. 6A is a plan view of the writing unit 92 when the writing unit 92 is attached to the image forming apparatus 1 when viewed from above, according to the present embodiment. FIG. 6B is a perspective view of the writing unit 92 when the writing unit 92 is attached to the image forming apparatus 1, according to the present embodiment. FIG. 6C is a perspective view of the guide 95 when the writing unit 92 is detached, according to the present embodiment. The end guide 95*e* is an example of a fourth guide. The end guide 95*e* restricts the outer shape of the writing unit 92 when the writing unit 92 is attached to the image forming apparatus 1. Such a configuration can prevent the writing unit 92 from being rattled while the writing unit 92 is attached to or detached from the image forming apparatus 1 in a direction perpendicular to the attachment and detachment directions of the writing unit 92, in other words, in the left-right direction. When the writing unit 92 is attached to the image forming apparatus 1, the positioning bosses 92*a* and 92*b* of the writing unit 92 enter the holes 98*a* and 98*b*, respectively, of the frame 98, and a vertical surface at the rear end of the writing unit 92 is engaged with a vertical surface of the housing of the image forming apparatus 1. Thus, the writing unit 92 is positioned in a direction in which the writing unit 92 is attached. The above-described configuration will be described in detail below.

Accordingly, the positioning bosses 92*a* and 92*b* of the writing unit 92 can smoothly enter the holes 98*a* and 98*b*, respectively, of the frame 98 that is fixed to the housing of the image forming apparatus 1. Thus, the writing unit 92 can be more easily attached.

As illustrated in FIG. 5, after the writing unit 92 has been attached to the image forming apparatus 1, a predetermined gap 97 is formed between the writing unit 92 and the horizontal portion 95*a* of the guide 95 in a state in which the writing unit 92 is attached to the frame 98 of the image forming apparatus 1. Forming the gap 97 as described above prevents the writing unit 92 and the guide 95 from contacting each other when the writing unit 92 is supported by the housing of the image forming apparatus 1. When vibration of the image forming apparatus 1 is transmitted to the writing unit 92, light emitted from the writing unit 92 to the photoconductor 21 may fluctuate and may cause an image failure. For this reason, the above-described configuration is adopted to prevent such an image failure from occurring due to such a phenomenon as described above. The gap 97 is 2 mm in the present embodiment. However, the gap 97 being 2 mm is merely an example, and the gap 27 may be changed as needed in accordance with, for example, the configuration of the writing unit 92, or may have a numerical range.

Figure 7:
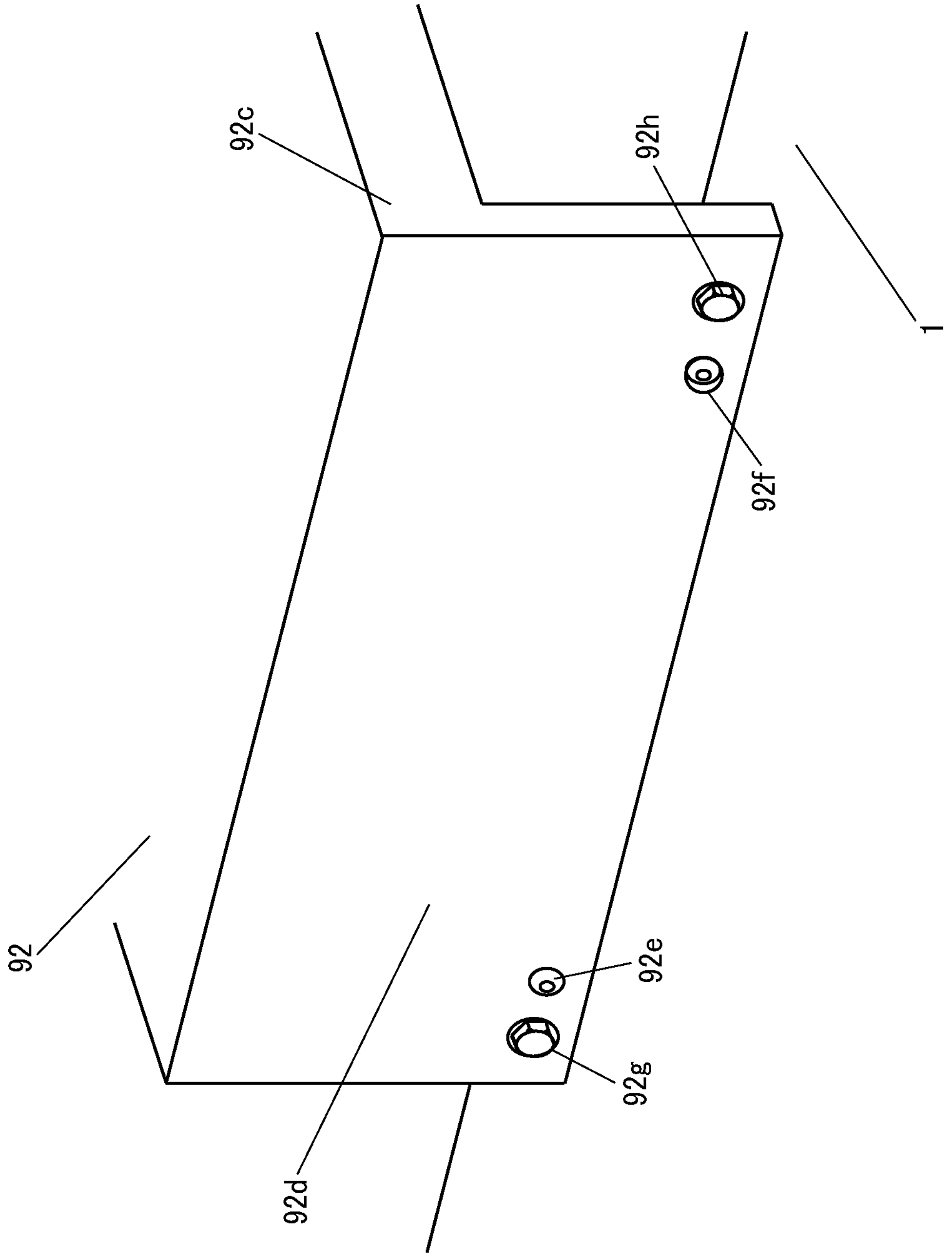
FIG. 7 is a diagram illustrating an attachment plate according to an embodiment of the present disclosure.

Next, a configuration in which the writing unit 92 is attached to the housing of the image forming apparatus 1 on a side of the housing through which the writing unit 92 is detached (left side in FIG. 2A) is described with reference to FIG. 7. An attachment portion 92*d* is formed on the housing 92*c* in a direction in which the housing 92*c* of the writing unit 92 is detached. The attachment portion 92*d* includes positioning portions 92*e* and 92*f* and screw fasteners 92*g* and 92*h*.

The position of the writing unit 92 is determined by the positioning portions 92*e* and 92*f*. Further, the writing unit 92 is screwed with the screw fasteners 92*g* and 92*h*, so that the writing unit 92 is supported by and fixed to the housing of the image forming apparatus 1.

Note that the writing unit 92 can be supported by the housing of the image forming apparatus 1 without contacting the image forming apparatus 1 at positions other than the positioning bosses 92*a* and 92*b*, the positioning portions 92*e* and 92*f* of the attachment portion 92*d*, and the screw fasteners 92*g* and 92*h*.

Figure 8A:
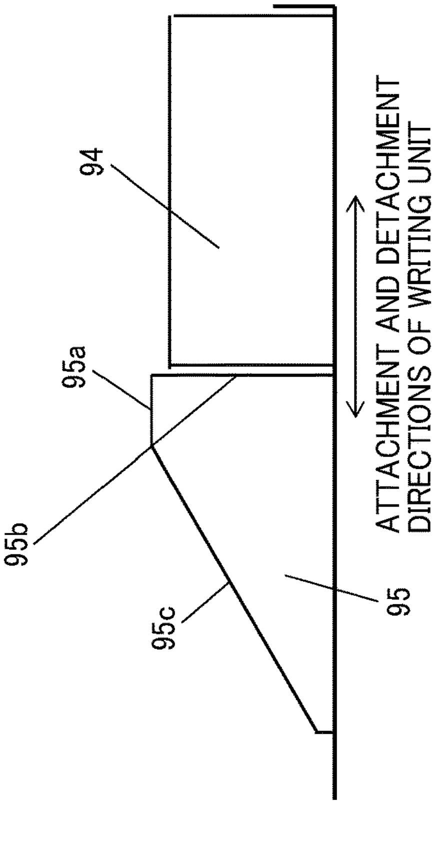
FIGS. 8A and 8B are diagrams illustrating a waste toner bottle when the waste toner bottle is attached or detached, according to an embodiment of the present disclosure.

Next, functions of the guide 95 other than guiding the attachment and detachment of the writing unit 92 is described with reference to FIGS. 8A and 8A. As illustrated in FIG. 8A, the guide 95 includes a waste toner bottle guide 95*b*. The waste toner bottle guide 95*b* is an example of a third guide. Accordingly, the guide 95 also has a function of guiding the waste toner bottle 94 when the waste toner bottle 94 is attached or detached.

Figure 8B:
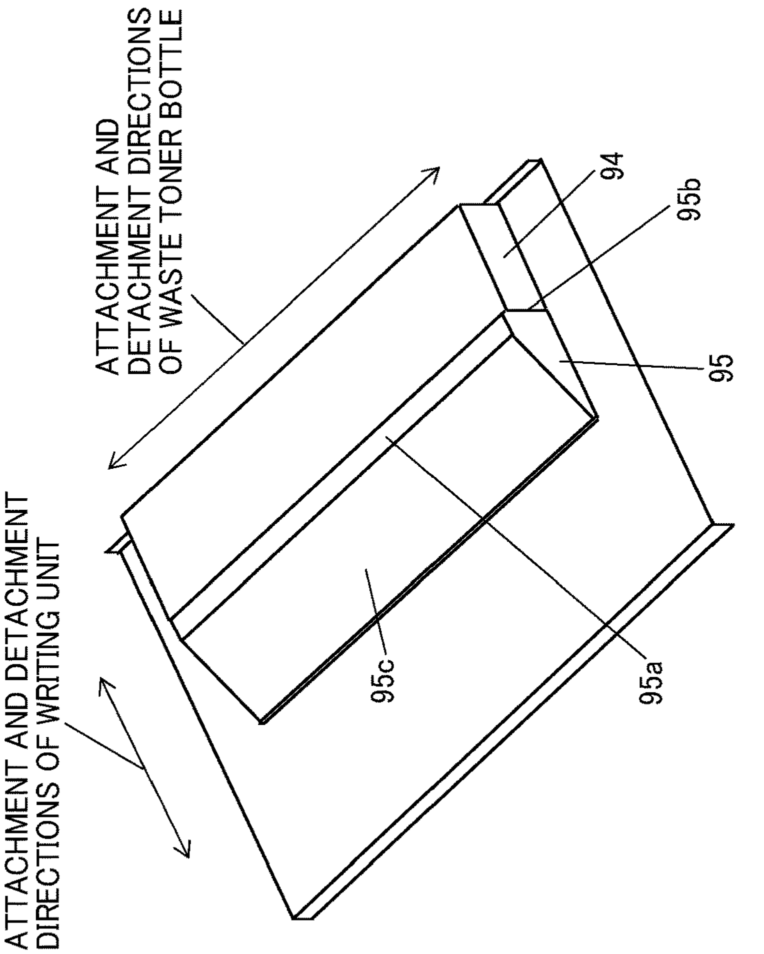

As illustrated in FIG. 8B, a direction in which the waste toner bottle 94 is attached or detached is orthogonal to the direction in which the writing unit 92 is attached or detached. An end of the waste toner bottle 94 (e.g., a left end of the waste toner bottle 94 in FIG. 8A) is guided along the waste toner bottle guide 95*b*. Thus, the waste toner bottle 94 is unlikely to rattle and can be guided to a predetermined attachment position in the image forming apparatus 1. Furthermore, providing multiple functions to one component such as the guide 95 allows the number of components to be reduced.

Next, an operation procedure in which the writing unit 92 is attached to or detached from the image forming apparatus 1 is described with reference to FIGS. 9A, 9B, and 9C.

Figure 9A:
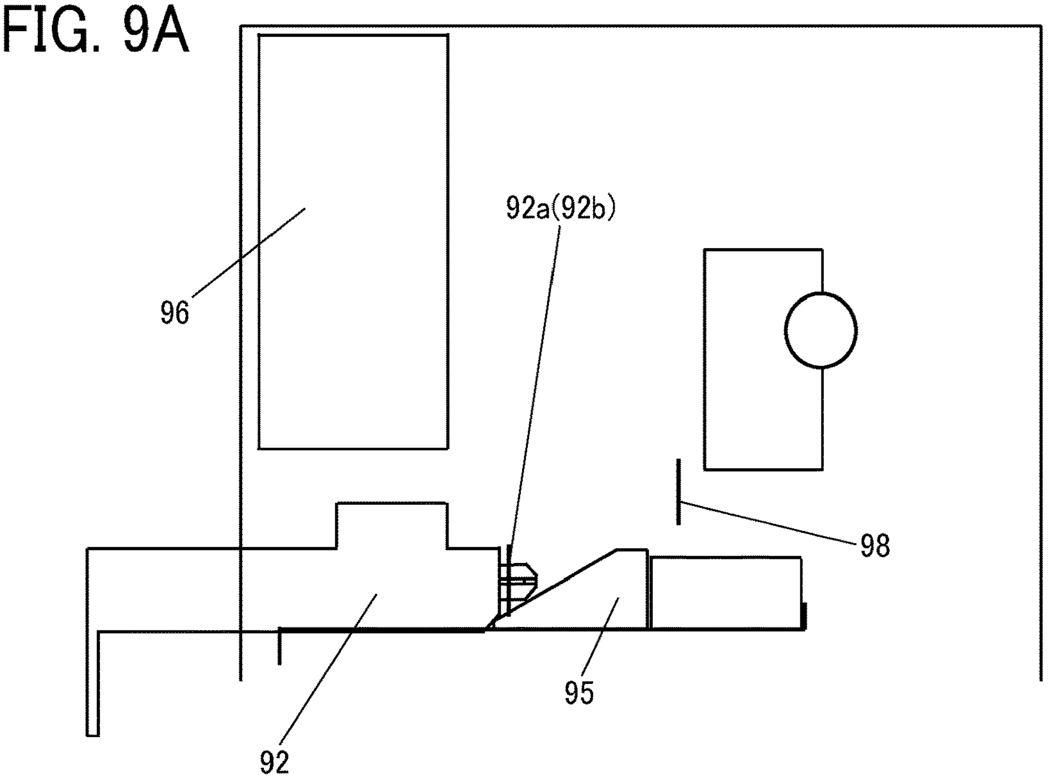
FIGS. 9A, 9B, and 9C are diagrams illustrating an operation in which the writing unit of FIG. 2A is attached to or detached from the image forming apparatus of FIG. 1A.
Figure 9B:
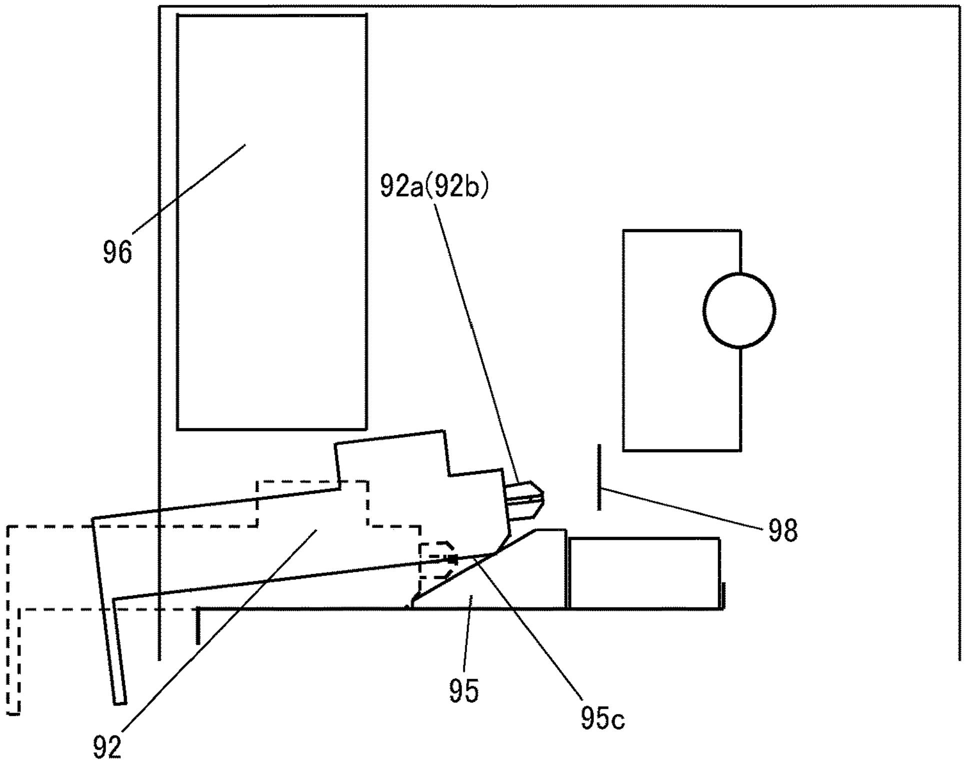

First, as illustrated in FIG. 9A, the writing unit 92 is inserted into the opening of the image forming apparatus 1. Then, as illustrated in FIG. 9B, the writing unit 92 is moved from the opening along a horizontal guide of the housing of the image forming apparatus 1 to the rear portion of the image forming apparatus 1, which is the right side in FIG. 9B. At this time, the writing unit 92 moves along the horizontal guide of the housing of the image forming apparatus 1 to the guide 95 and moves to the rear portion of the image forming apparatus 1 along the slope 95*c* of the guide 95.

Figure 9C:
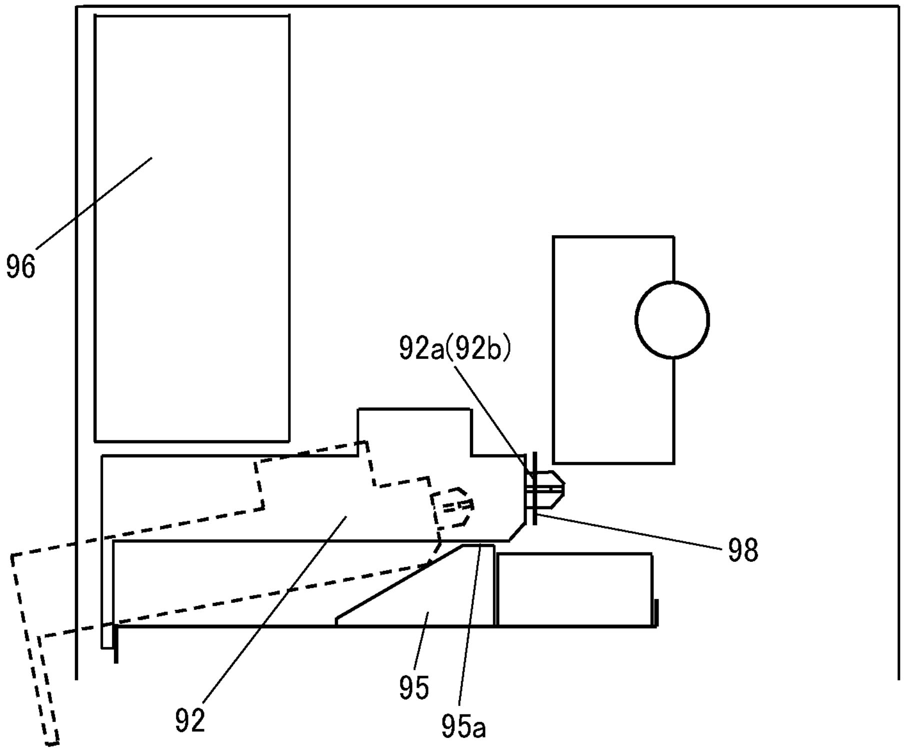

As illustrated in FIG. 9C, when the writing unit 92 reaches the vicinity of a position at which the guide 95 is attached to the frame 98, the writing unit 92 is guided by the horizontal portion 95*a* and takes a horizontal posture. Then, the positioning bosses 92*a* and 92*b* of the writing unit 92 vertically enter the holes 98*a* and 98*b*, respectively, of the frame 98 while the writing unit 92 maintains the horizontal posture.

In a front portion, which is on the left side in FIG. 9C, of the image forming apparatus 1, the writing unit 92 is positioned with respect to the housing of the image forming apparatus 1 by the positioning portions 92*e* and 92*f*, which are disposed on the attachment portion 92*d* in the direction in which the housing 92*c* of the writing unit 92 is detached. Thus, the positioning of the writing unit 92 with respect to the image forming apparatus 1 is completed.

Subsequently, the writing unit 92 is screwed and fixed with the screw fasteners 92*g* and 92*h*, so that the writing unit 92 is supported and fixed to the image forming apparatus 1.

An operation for detaching the writing unit 92 from the image forming apparatus 1 is performed in the reverse order of the above-described operation for attaching the writing unit 92 to the image forming apparatus 1.

The above-described configurations are some examples, and the following aspects of the present disclosure have, for example, advantageous effects described below.

First Aspect

In a first aspect of the present disclosure, an image forming apparatus includes a housing, a first detachable unit such as the writing unit 92 attachable to and detachable from the housing of the image forming apparatus, and a guide such as the guide 95 that includes a first guide portion such as the slope 95*c*, to guide movement of the first detachable unit when the first detachable unit is detached from the housing of the image forming apparatus. The first detachable unit includes positioning portions such as the positioning bosses 92*a* and 92*b* that protrude in a direction in which the first detachable unit is attached to or detached from the housing of the image forming apparatus. The housing includes a unit positioner such as the frame 98 that engages with the positioning portions of the first detachable unit at positions above the guide to position the first detachable unit. The guide includes a second guide portion such as the horizontal portion 95*a* that extends from an upper end of the first guide toward a side of the housing in which the unit positioner is disposed.

Second Aspect

In a second aspect of the present disclosure, the second guide portion according to the first aspect is a horizontal portion having a horizontal surface.

Third Aspect

In a third aspect of the present disclosure, the guide according to the first aspect or the second aspect, includes a third guide portion such as the waste toner bottle guide 95*b* to guide attachment and detachment of a second detachable unit that is attachable to or detachable from the housing of the image forming apparatus in a direction orthogonal to the direction in which the first detachable unit is attached to or detached from the housing.

Fourth Aspect

In a fourth aspect of the present disclosure, the positioning portions according to any one of the first aspect to the third aspect is a frame such as the frame 98 that extends upward and having a flat surface.

Fifth Aspect

In a fifth aspect of the present disclosure, the guide according to any one of the first aspect to the fourth aspect includes a fourth guide portion such as the end guide 95*e* that restricts the first detachable unit from moving in a direction orthogonal to the direction in which the first detachable unit is attached to or detached from the housing.

Sixth Aspect

In a sixth aspect of the present disclosure, the image forming apparatus according to any one of the first aspect to the fifth aspect includes a component such as the electrical unit 96 fixed to the housing above the first detachable unit and on a front portion of the housing in a direction in which the first detachable unit is detached from the housing.

Seventh Aspect

In a seventh aspect of the present disclosure, the first detachable unit according to any one of the first aspect to the sixth aspect is a writing unit such as the writing unit 92.

Eighth Aspect

In an eighth aspect of the present disclosure, the second detachable unit according to any one of the first aspect to the seventh aspect is a waste toner bottle such as the waste toner bottle 94.

Ninth Aspect

In a ninth aspect of the present disclosure, the first detachable unit according to any one of the first aspect to the eighth aspect is positioned by the unit positioner at a predetermined gap such as the gap 97 between the first detachable unit and the guide.

According to any one of the first to ninth aspects, the attachment-and-detachment path can be secured and the first detachable unit can be attached to or detached from the image forming apparatus without detaching the fixed unit from the image forming apparatus. Accordingly, when the detachable unit is attached to the image forming apparatus, the detachable unit can be easily attached and positioned in the image forming apparatus.

In any one of the first to ninth aspects, the attachment and detachment path can be secured and the first detachable unit can be attached to or detached from the image forming apparatus without detaching the fixed unit from the image forming apparatus. Accordingly, when the detachable unit is attached to the image forming apparatus, the detachable unit can be easily attached and positioned in the image forming apparatus.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:

a housing;

a fixed component affixed to the housing;

a writing unit attachable to and detachable from the housing;

a waste toner bottle attachable to and detachable from the housing; and a guide to guide the writing unit when the writing unit is attached to or detached from the housing, the guide including a first guide portion inclined downward to guide the writing unit such that the writing unit moves downward in a direction in which the writing unit is detached from the housing, wherein the writing unit includes a positioning portion that protrudes in a direction in which the writing unit is attached to the housing, wherein the housing includes a unit positioner that engages with the positioning portion of the writing unit at a position above the guide to position the writing unit, wherein the guide includes a second guide portion that extends from an upper end of the first guide portion toward a side of the housing in which the unit positioner is disposed;

wherein the guide includes a third guide portion to guide said waste toner bottle when said waste toner bottle is attached or detached, and wherein said waste toner bottle is attachable or detachable in a direction orthogonal to the direction in which the writing unit is attached to or detached from the housing.

2. The image forming apparatus according to claim 1, wherein the second guide portion is a horizontal portion having a horizontal surface.

3. The image forming apparatus according to claim 1, wherein the unit positioner is a frame extending in an up-and-down direction and having a flat surface.

4. The image forming apparatus according to claim 1, wherein the guide includes a fourth guide portion that regulates the writing unit from moving in a direction orthogonal to the direction in which the writing unit is attached to or detached from the housing and extends parallel to the direction in which the writing unit is attached to or detached from the housing.

5. The image forming apparatus according to claim 1, wherein the writing unit is positioned by the unit positioner at a predetermined gap between the writing unit and the guide.

6. The image forming apparatus according to claim 1, wherein the fixed component is disposed in a front portion of the housing at a position above the writing unit overlapping the writing unit in an up-and-down direction relative to a direction in which the writing unit is attached and detached from the housing.

* * * * *